United States Patent [19]
Wilson

[11] Patent Number: 5,282,979
[45] Date of Patent: Feb. 1, 1994

[54] DESALINATION SYSTEM HAVING RECHARGEABLE SYPHON CONDUIT

[76] Inventor: Henry A. Wilson, 7461 W. Belvedere Rd., West Palm Beach, Fla. 33411

[21] Appl. No.: 954,155

[22] Filed: Sep. 30, 1992

[51] Int. Cl.⁵ .................... B63J 1/00; B01D 1/30
[52] U.S. Cl. ........................... 210/774; 137/142; 137/152; 159/903; 159/DIG. 23; 202/270; 203/10; 203/DIG. 17; 210/175
[58] Field of Search .............. 137/123, 142, 151, 152, 137/153; 159/29, 903, 904, DIG. 23; 203/DIG. 1, DIG. 17, 10; 210/86, 90, 175, 232, 774, 248, 257.1, 744; 202/81-83, 270

[56] References Cited

U.S. PATENT DOCUMENTS

| | | | |
|---|---|---|---|
| 2,342,062 | 2/1944 | Schenk | 159/903 |
| 2,342,201 | 2/1944 | Kain | 203/DIG. 17 |
| 2,490,659 | 12/1949 | Snyder | 159/903 |
| 3,021,860 | 2/1962 | Gandy | 137/152 |
| 3,096,257 | 7/1963 | Foutz | 203/DIG. 1 |
| 3,236,768 | 2/1966 | Litt | 210/636 |
| 4,135,985 | 1/1979 | Larocca | 159/903 |
| 4,303,092 | 12/1981 | Logan | 137/152 |
| 4,504,362 | 3/1985 | Kruse | 203/DIG. 1 |
| 4,514,260 | 4/1985 | El Din Nasser | 202/270 |
| 5,006,264 | 4/1991 | Acuna | 210/776 |

FOREIGN PATENT DOCUMENTS 1587009 8/1990 U.S.S.R. .......... 203/DIG. 1

Primary Examiner—Joseph W. Drodge
Attorney, Agent, or Firm—Quarles & Brady

[57] ABSTRACT

A desalination system includes a transfer conduit between a pool of salt water and a pool of desalinated water. The conduit is initially filled with water and is then elevated so that a portion of the conduit is above the syphon height of water at atmospheric pressure with the open ends of the conduit submerged below the respective pools. Using solar heat to create a temperature differential in the conduit, desalinated water vapor is transferred across a partial vacuum volume formed in the conduit.

11 Claims, 6 Drawing Sheets

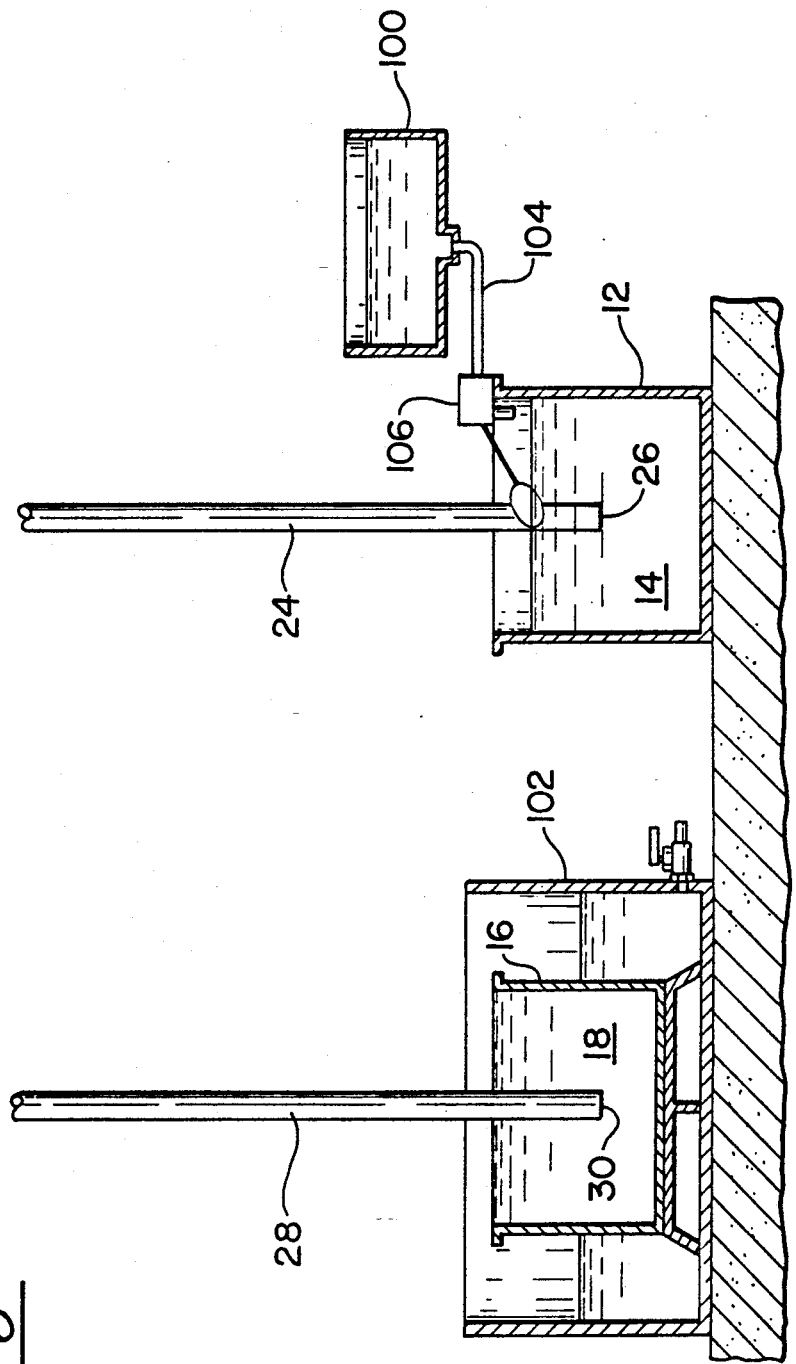

DESALINATION SYSTEM HAVING RECHARGEABLE SYPHON CONDUIT

FIELD OF THE INVENTION

The present invention relates generally to methods and apparatus for decontaminating contaminated fluids. More particularly, the invention relates to methods and apparatus for desalinating salt water.

BACKGROUND OF THE INVENTION

Populations living in arid environments, such as deserts and drought-stricken areas, must of rely on importation for their fresh water supply. This importation can be costly and, in some instances, economically impossible to obtain. In areas where a salt water source is nearby, desalination equipment is sometimes employed to provide potable water to the inhabitants. However, some societies are too poor to purchase and maintain the equipment and bear the associated fuel requirements.

SUMMARY OF THE INVENTION

It is an object of the invention to provide a practical and realistic means for supplying potable water to economically deprived populations suffering chronic droughts.

It is another object of the invention to provide a desalination system that can provide potable water using only natural sources of energy, such as the sun.

It is a further object of the invention to provide a desalination system that can be simply maintained with minimal instruction.

It is a still further object of the invention to provide a desalination system that is constructed of relatively few and simply assembled components.

It is yet another object of the invention to provide a system of desalination which can be constructed in naturally occurring structures, such as mountains, to produce greater quantities of fresh water than may otherwise be possible.

These and other objects of the invention are achieved by a desalination system generally comprising a conduit extending upwardly from a salt water supply and a second conduit extending upwardly from a fresh water store interconnected above the standard atmospheric syphon height for water by a transfer duct.

As used throughout the specification and claims, this syphon height refers to the height of a column of raised in water a vertical tube between a partial vacuum and a pool of water expand to atmosphere pressure. The tube has an open end and a closed end; the tube is filled and inverted with its open end submerged in the open pool of water. At standard atmospheric pressure, this syphon height is approximately 34 feet.

In one embodiment, the system is originally charge full of water in a lying position, temporarily sealed and then righted. The lower, sealed openings of the conduits are submerged in the salt and fresh water pools, respectively. When the openings are unsealed, the water in the system lowers to the syphon level, leaving a lowered vapor pressure, below atmospheric pressure, in the transfer duct between the two stands of water.

The column of salt water is heated to evaporated the water at the upper surface of the column. The fresh water column is cooled to condense the water vapor in the transfer area. Thus, the temperature differential between the two columns generates a saltfree water vapor migration across the transfer duct.

To eliminate fuel requirements, the desalination system can be constructed outside and exposed to the sun to generate the necessary temperature differential. Other means can also be employed to heat the salt water column and relatively cool the fresh water column.

The tubing of the salt water column can be enlarged at or slightly below the surface level to increase the evaporation surface area. Similarly, increased surface area for condensation can be generated on the fresh water side by dividing the transfer duct into a series of channels or a descending coil.

Eventually, oxygen and other gases migrate to the reduced vapor pressure transfer volume, causing an increase in the volume vapor pressure and a reduction in the water transfer efficiency. The invention provides means for detecting this change as well as means for recharging the system.

The invention also provides means for resupplying salt water from a reservoir to the supply of the salt water conduit as well as a storage mechanism for drawing fresh water from the fresh water store of the fresh water conduit.

BRIEF DESCRIPTION OF THE DRAWINGS

A more thorough understanding of the invention can be gained from the following detailed description in conjunction with the accompanying drawings, in which:

FIG. 6 is a front elevational view of a embodiment of the water supply and storage assembly of the invention.

DETAILED DESCRIPTION OF THE PREFERRED EMBODIMENTS

The invention is primarily directed to apparatus and methods of desalinating salt water, but the structure and steps utilized to desalinate salt water may have other applications in separating contaminants from water or other fluids. Salt water is referenced herein generally as any salt water mixture in which the concentration of salt is too high for prolonged human consumption while fresh, potable and desalinated are used interchangeable to reference water in which the salt concentration is sufficiently low for prolonged human consumption.

Figure 1:
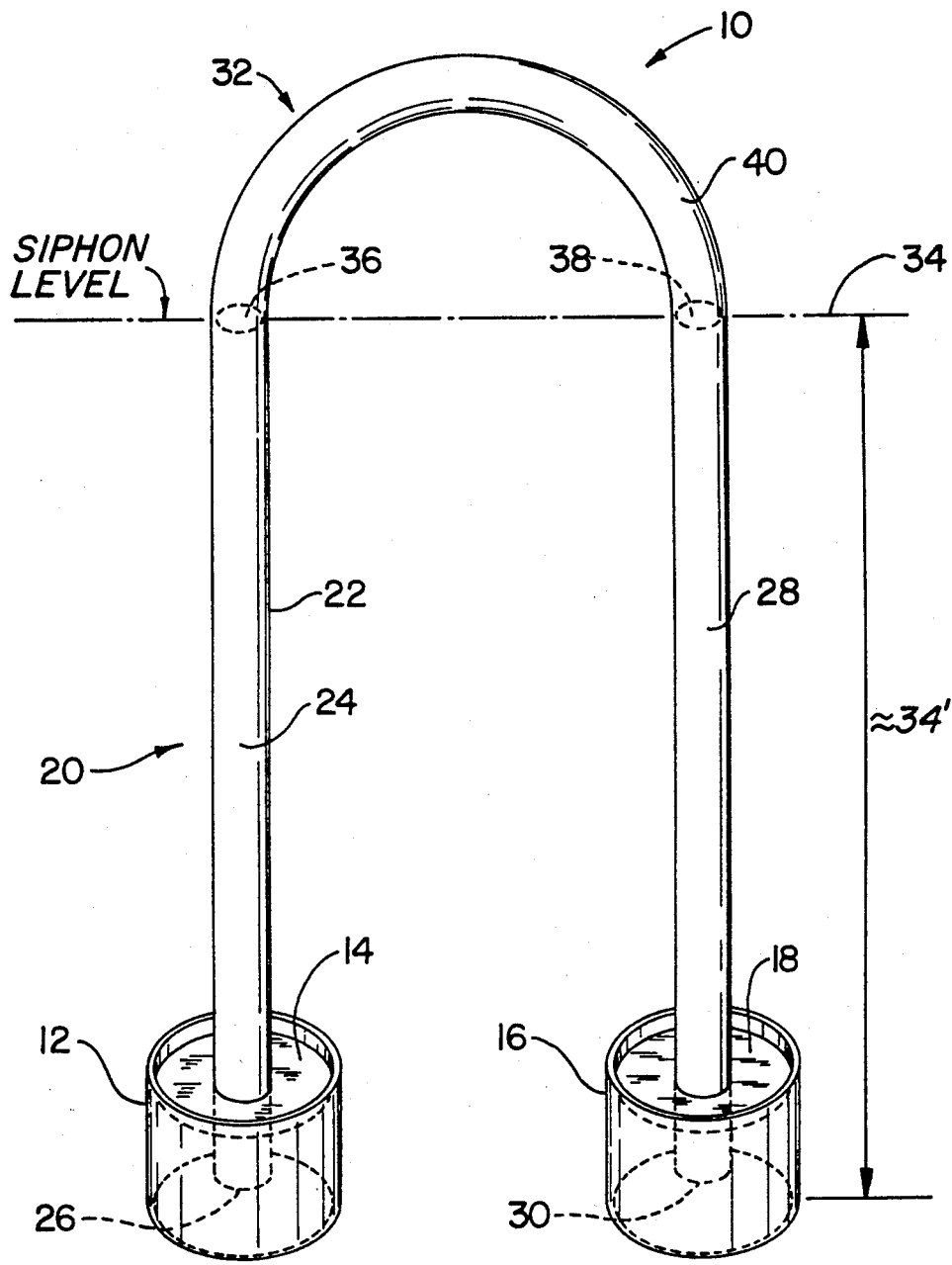
FIG. 1 is a side elevational view of simplified apparatus for desalination according to the invention.

Referring to FIG. 1, the desalination system 10 generally includes a container 12 for storing a pool 14 of salt water and a container 16 for storing a pool 18 of desalinated water interconnected by a transfer conduit 20. The transfer conduit 20 can be formed by an inverted U-shaped tubing 22 defining a salt water column 24 with a first end opening 26 submerged in the salt water pool 14 and a fresh water column 28 with a second end opening 30 submerged in the fresh water pool 18.

Prior to placement in the operational position as shown, the transfer conduit 20 can be laid substantially horizontally and completely filled with water. With its end openings 26 30 temporarily capped, the transfer conduit 20 is righted so that a portion 32 is elevated above the syphon height 34 of water at atmospheric pressure.

The end openings 26, 30 are submerged in the respective pools 14, 18, and the caps are removed, allowing the water columns 24, 28 in the transfer conduit 20 to reach an equilibrium. The top surfaces 36, 38 of the salt water column 26 and the fresh water column 28 stabilize at the syphon height 34, creating a partial vacuum with reduced vapor pressure in a transfer Volume 40 between the top surfaces 36, 38.

Figure 2:
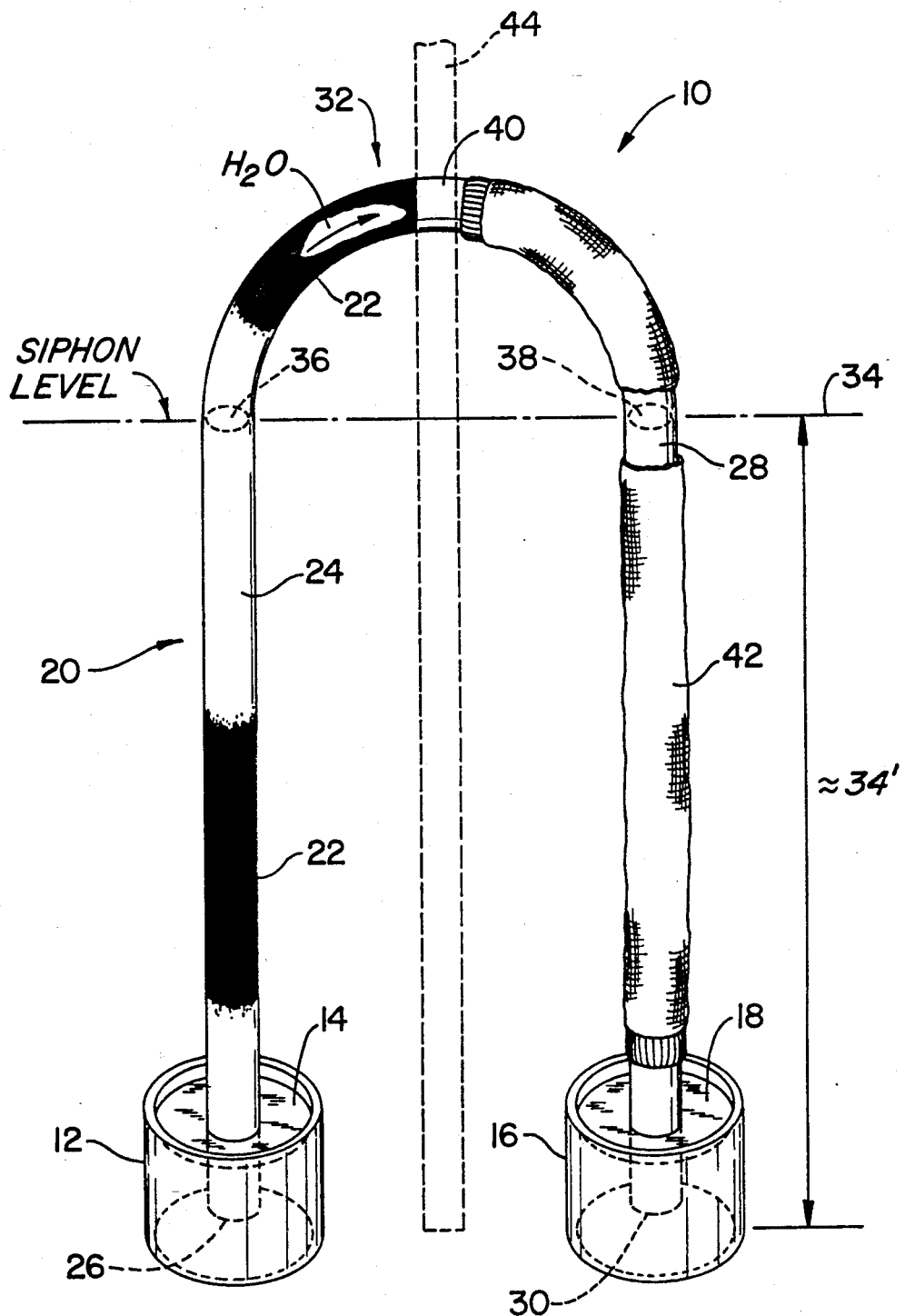
FIG. 2 is a side elevational view similar to FIG. 1, showing structure for creating a temperature differential in the apparatus.

Referring to FIG. 2, in order to induce a transfer of fresh water vapor from the salt water column 24 to the fresh water column 28, the salt water column 24 is heated to evaporate water at the top surface 36. Because of the reduced pressure in the transfer volume 40, the evaporation temperature is reduced, thereby facilitating vapor transfer. The fresh water column 28 and a portion of the tubing 22 surrounding the transfer volume 40 are cooled relative to the salt water column 24 to condense the evaporated vapor proximate the fresh water column 28 for collection in the fresh water column 28 and its associated pool 18.

Heating for generating the temperature differential between the salt water column 24 and the fresh water column 28 can be provided in a variety of ways. Because it is an object of the invention to provide a fuel independent desalinator, the presently preferred heating mechanism is heat from the sun acting upon dark and light surfaces. The portion of the tubing 22 surrounding the salt water column 24 can be constructed of a good conductor painted a dark color, such as black, illustrated in cutaway in FIG. 2. The portion of the tubing 22 surrounding the condensation side of the transfer volume 40 and the portion of the tubing 22 surrounding the fresh water column 28 can be constructed with an insulator painted a light color, such as white.

Alternatively and preferably, the transfer volume 40 and fresh water portions of the conduit 20 can be covered by an absorbent material, such as a cotton sleeve 42, wetted with a running fluid, such as excess salt water from a reservoir (not shown). The salt water is evaporated by the solar heat, utilizing the energy and shielding the underlying water and vapor. The running water can also convectively carry any heat away from the fresh water portions of the conduit 20.

The transfer volume and fresh water portions of the conduit 22 can also be shielded from direct radiation of the solar heat by an enclosure. As the desalination system 10 can be installed adjacent a side wall 44 of a dwelling, the protected portions can be placed indoors while the salt water portion remains outside. This placement would also internalize the fresh water output for protection against outside contamination and theft.

Figure 3:
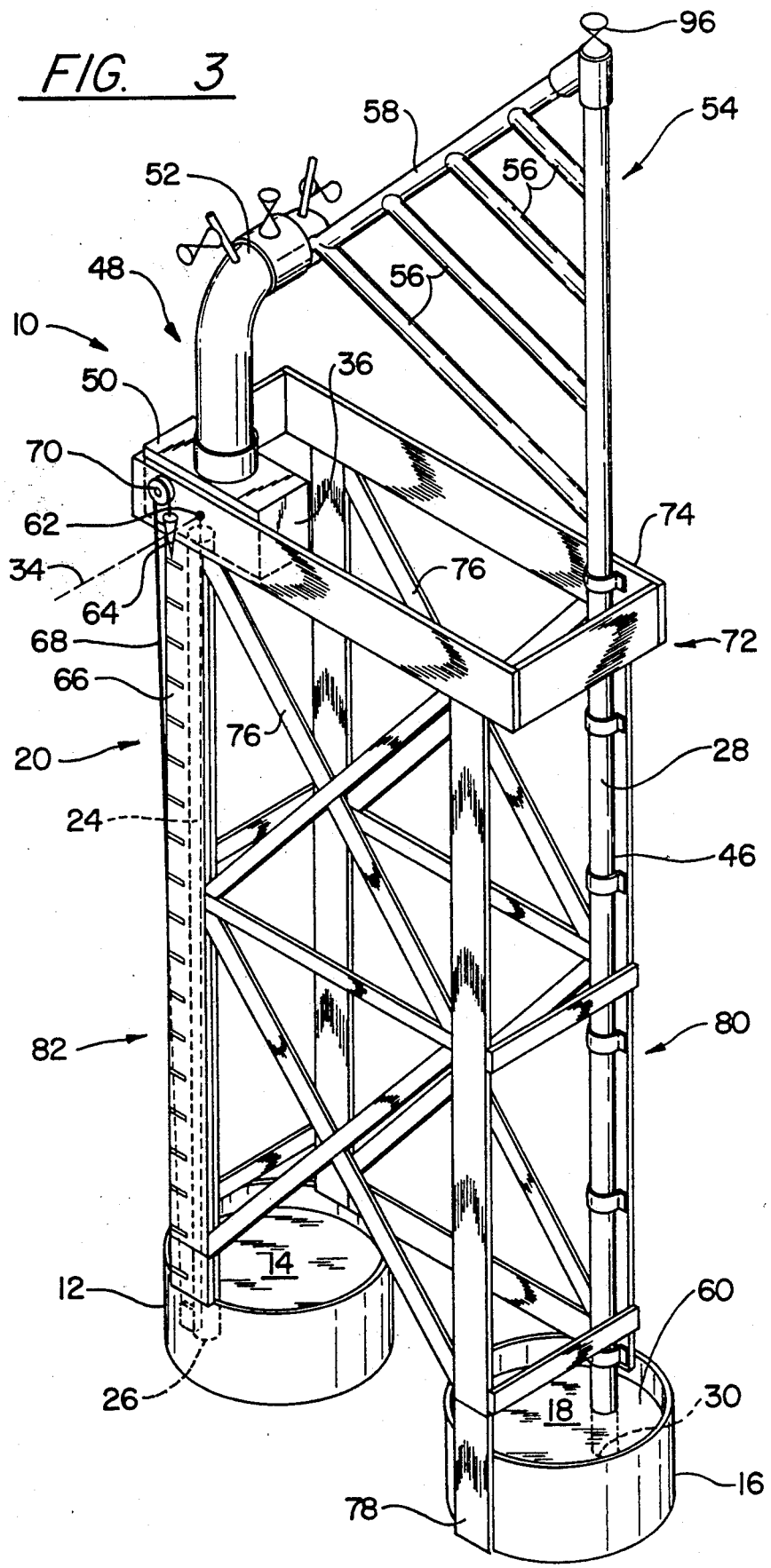
FIG. 3 is a perspective view of a desalination system according to the invention.

As shown in FIG. 3, the conduit 20 can alternatively and preferably be constructed of tubing 46 supporting the salt water column 24 and the fresh water column 28 with an enlarged transfer volume portion 48. The tubing 46 is preferably small, perhaps ¼ diameter, to reduce the quantity of water needed during recharging operations. Directly below the syphon height 34 of the salt water column 24, the salt water column 24 interfaces with a horizontally expansive conduit, such as an evaporation box 50, in which the top surface 36 of the salt water is increased in surface area for more efficient evaporation. The vapor created in the evaporation box 50 travels to a transfer curve 52, which is curved rearwardly for recharging purposes discussed below.

The vapor and any condensed desalinated water is conveyed to a condensation chamber 54 that preferably includes a series of inclined passageways 56 connected by a inclined supply pipe 58. As vapor rises in the supply pipe 58 and travels throughout the condensation chamber 54, the cooling provided by light paint, an evaporative sleeve or an enclosure (FIG. 2) combines with the increased surface area provided by the series of passageways 56 to condense the fresh water vapor. The condensate travels down the inclined passageways 56 for collection in the fresh water column 28. The surface area can be further increased by intermittently placing discs having a plurality of apertures across the passages (not shown). Alternatively, the condensation chamber 54 can include a downwardly spiraled coil between the hose and the tubing (not shown).

The fresh water condensate is collected on the top surface 38 of the desalinated water column 28, causing it to rise. The pressure differential between the transfer volume 48 and the atmosphere induce an equilibrium causing the fresh water pool surface 60 to rise, representing the accumulated fresh water.

Eventually, oxygen and other gases are released from the water columns 24, 28 and increase the vapor pressure in the transfer volume 48. The increased pressure reduces the efficiency of the evaporization/condensation process. The increased pressure can manifest itself in a lowering of the column top surfaces 36, 38, which can be can be detected and monitored by detection means, such as a float 62 connected to a weight marker 64 of a gage 66. Through a line 68 around 70, pulleys the descent of the float 62 causes a descent of the marker 64 on the gage scale 66.

Figure 4A:
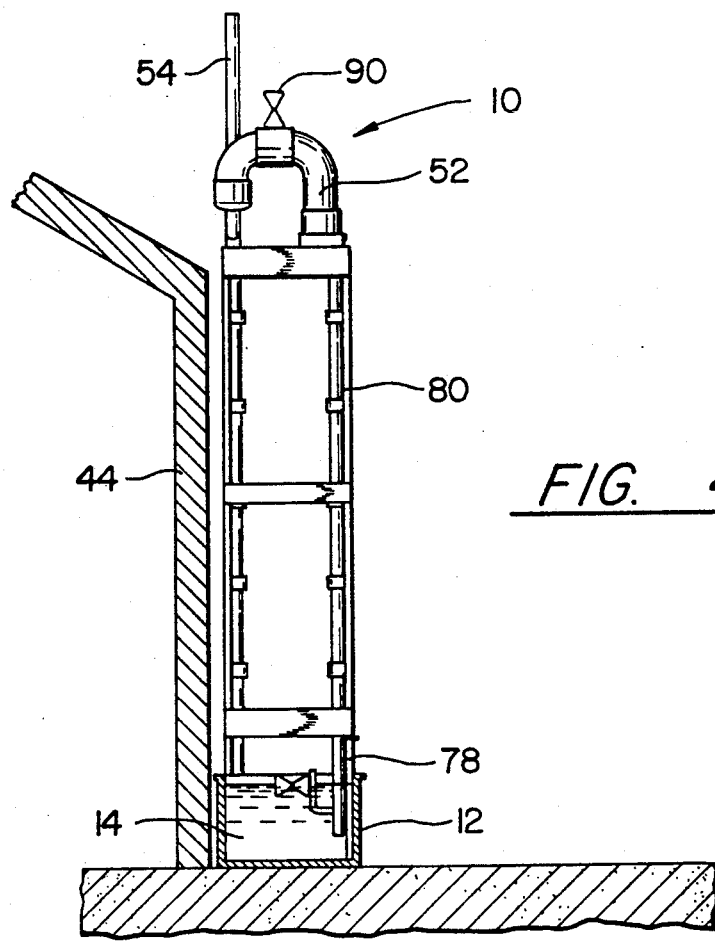
FIG. 4A is a side elevational view thereof in an upright, operational position.
Figure 4B:
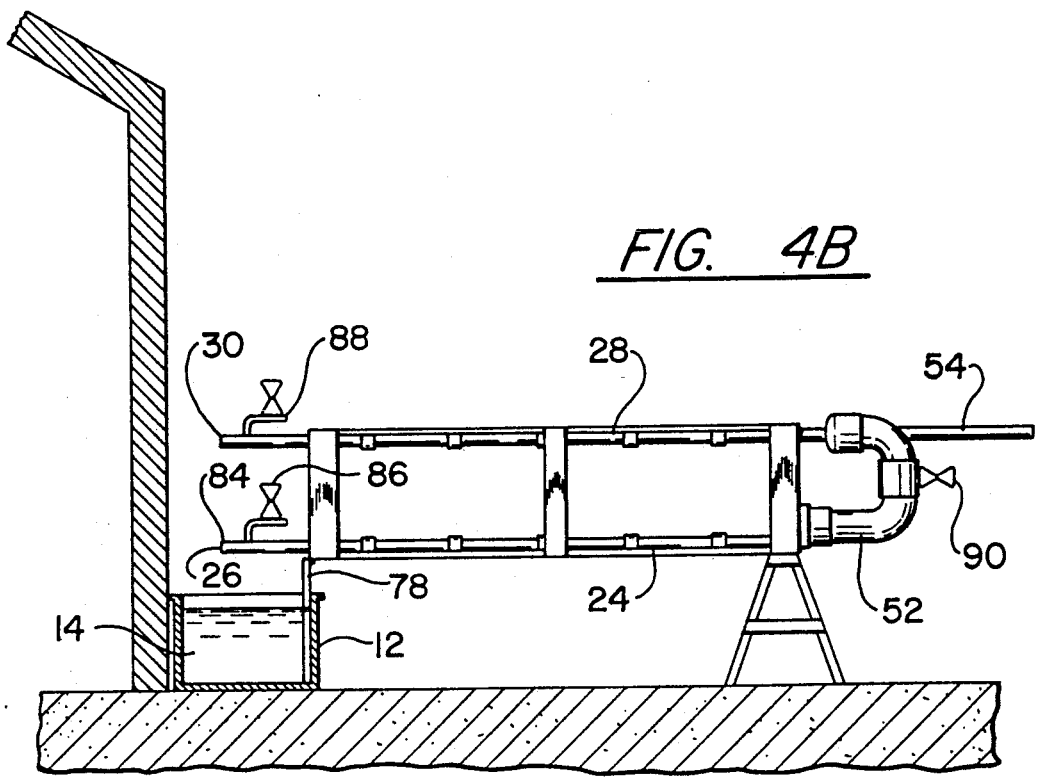
FIG. 4B is a side elevational view thereof in a lowered recharging position.

To eliminate the increased pressure, the system 10 can be recharged. The transfer conduit 20 can be mounted to support structure 72, including back plates 74 and a cross members 76. Referring to FIGS. 4A and 4B, the support structure 72 can be pivotally connected to a base 78 to pivot between an upright, operational position, as shown in FIG. 4A, and a substantially horizontal, recharging position, as shown in FIG. 4B. In the vertical, operational position, the fresh water column 28 is set forward toward the house sidewall 44 so that in the lowered, horizontal position, the fresh water column 28 is elevated above the salt water portion of the conduit 20 for recharging. A framework 80 that is pivotal on a front face 82 can be provided to support the system 10.

Prior to lowering the transfer conduit 20, the end openings 26, 30 are sealed, such as by a caps 84. When the transfer conduit 20 is lowered, the framework 80 is inclined so that the transfer curve 52 extends upwardly, thereby separating the fresh water and salt water sides. Salt water can be filled into the system 10 through a filling spout 86 until overflow occurs in the spout 86, at which time it is plugged. The fresh water side of the system 10 provides a similar spout 88 that is filled with fresh water until overflow occurs. Because the spouts 86, 88 are higher than the remainder of the transfer conduit 20, this overflow verifies complete filling. The fresh water does not mix with the salt water and bottoms out on the top surface of the fresh water level in the transfer volume. The fresh water spout 88 is then corked. A valve 90 can also be provided to separate the fresh and salt water sides until the system 10 is returned to its operational condition.

When the transfer conduit 20 is returned to the upright position, the end openings 26, 30 are submerged and uncapped. The equilibrium is again reached and a partial pressure is established in the transfer volume 48.

Figure 5:
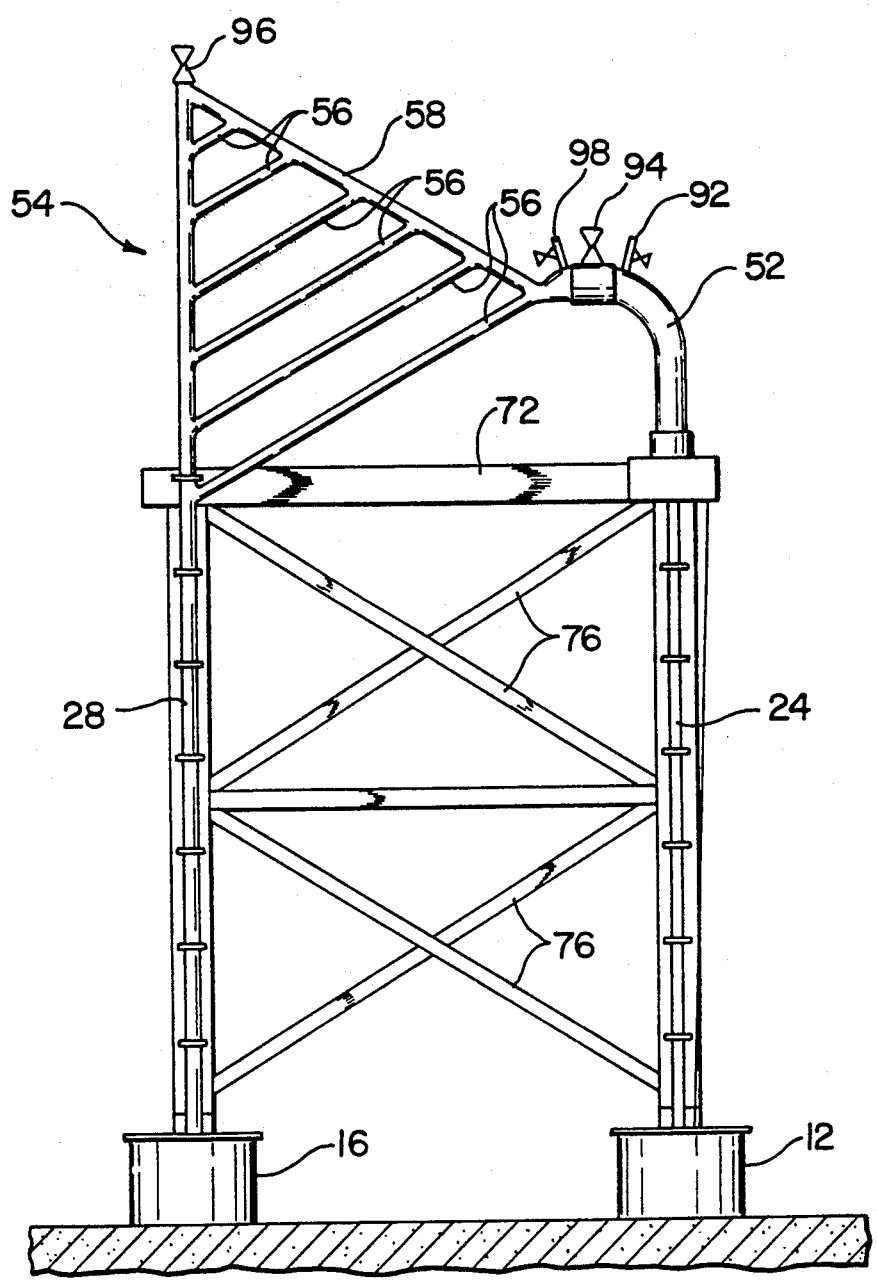
FIG. 5 is a front elevational view of a second embodiment according to the invention.

Referring to FIG. 5, the system 10 can be constructed to remain in the vertical, operational position, and the recharging process can be performed by filling through a series of valves located along the top of the system 10. In this embodiment, the transfer curve 52 can extend laterally toward the fresh water portion. A filling opening 92 is provided in the transfer curve 52 on the downward side toward the salt water column 24. Adjacent this opening 92 is a valve 99 for sealing the salt water side from the fresh water side. During recharging, this valve 94 is closed and salt water is used to refill the salt water side. The fresh water side is recharged through an inlet valve 96 disposed at the top of the condensation chamber 54. A purge valve 98 can also be provided to release any air that may be trapped at the apex of the transfer curve 52.

When the system 10 is recharged, caps or valves sealing the bottom openings 26, 30 can be opened. At this point, it is preferable to have the valve 94 between the salt and fresh water sides closed so that opening one end 30 before the other 26 does not create a vacuum to draw the salt column 24 across the transfer volume 48 to the fresh water side. The water levels are lowered to the syphon level 34, and the valve 94 separating the salt and fresh water sides can be opened.

Referring to FIG. 6, the containers 12, 16 for the salt water and the fresh water may be relatively small to avoid interferences with the pivoting of the support structure for recharging (see FIGS. 4A and 4B). Accordingly, the salt water container 12 can be automatically supplied by a larger reservoir 100 as the salt water is depleted in the container 12 by the process. Similarly, the fresh water container 16 can be supported by a storage vessel 102 to capture the overflow as fresh water is produced.

In the presently preferred embodiment, a large reservoir 102 can supply salt water through a pipe 104 controlled by a conventional floater valve 106 or other level-based control system. When the container water level drops below a predetermined level, additional water is received from the reservoir 100.

For the fresh water container 16, a the collection vessel 102 is disposed below and around the periphery of the container 16 to capture fresh water as it is supplied to the container 16 and overflows the top rim of the container 16. Other fluid supply and collection systems known in the art can of course be utilized with the desalinator of the invention.

Although the description of this invention has been given with reference to particular embodiments, this description is not to be construed as limiting the scope of this invention. Many variations and modifications may now occur to those skilled in the art in view of this disclosure. Accordingly, the scope of the present invention should not be determined by the above description, but rather by a reasonable interpretation of the appended claims.

I claim:

1. A desalination system, comprising:
    a pool of a salt water exposed to atmospheric pressure;
    a separate pool of desalinated water;
    a transfer conduit for transferring water from said salt water pool to said desalinated water pool without transferring salt to said desalinated water pool, said transfer conduit having end openings respectively submerged in said salt water and said desalinated water, said transfer conduit extending upwardly and having a portion above a syphon height of said salt water at atmospheric pressure, wherein said transfer conduit encloses a column of said salt water extending from said salt water pool and a column of desalinated water extending from said desalinated water pool separated by a transfer volume formed by initially filling said conduit with water and raising said transfer volume above said syphon height, whereby a top surface of said column of said salt water is elevated to said syphon height above a top surface of said pool of salt water exposed to atmospheric pressure;
    a heater for maintaining the temperature of the salt water above the temperature of the desalinated water column, said heater being operatively connected to said conduit and means for pivoting said conduit.

2. The system according to claim 1, wherein the heater includes a relatively darker portion of said conduit surrounding said column of salt water than the portion surrounding said column of desalinates water, whereby solar heat radiating on said portions maintains the temperature of the salt water above that of the desalinated water.

3. The system according to claim 1, further comprising an absorbent material wetted with cooling water surrounding the portion of the conduit enclosing said column of desalinated water, whereby solar heat evaporates the water, thereby cooling said column of desalinated water.

4. The system according to claim 1, further comprising an enclosure for the portion of the conduit enclosing said column of desalinated water to shield said portion from direct solar heat.

5. The system according to claim 1, wherein the conduit has an enlarged surface area at or slightly below the syphon height of said salt water column, whereby a greater evaporation surface area is created.

6. The system according to claim 1, wherein the conduit includes a plurality of inclined surfaces starting above the syphon height, whereby increased surface area for condensation of the desalinated water is created.

7. The system according to claim 1, further comprising means for lowering said conduit to a position wherein said transfer volume above the syphon height is placed below said end openings for refilling.

8. The system according to claim 1, further comprising means operatively connected to said conduit for lowering said conduit to a position wherein a portion enclosing said salt water column is below a portion enclosing the desalinated water column.

9. The system according to claim 1, wherein the salt water pool is stored in a container and the system further comprises a salt water reservoir tank above said container for supplying salt water to said container when the level in said container drops below a predetermined level.

10. The system according to claim 9, wherein the desalinated water pool is held in a second container and the system further comprises a desalinated water storage vessel below said second container to capture overflow from said second container.

11. A method of desalinating salt water comprising:
pooling salt water;
pooling desalinated water;
filling a conduit having end openings with at least one of salt water and desalinated water;
temporarily sealing the filled conduit;
raising a portion of the conduit above the siphon height for salt water at atmospheric pressure;
submerging the end openings respectively in the pool of salt water and the pool of desalinated water;
unsealing said openings, whereby said conduit encloses a column of salt water extending from said salt water pool and a column of desalinated water extending from said desalinated water pool separated by a transfer volume;
creating a temperature differential between said salt water column and said desalinated water column;
transferring water from said salt water pool to said desalinated water pool without transferring salt to said desalinated water column.

* * * * *